July 29, 1958
T. J. CRAWFORD
2,845,038
SEAM GUIDE ASSEMBLY
Filed Aug. 9, 1954
2 Sheets-Sheet 1
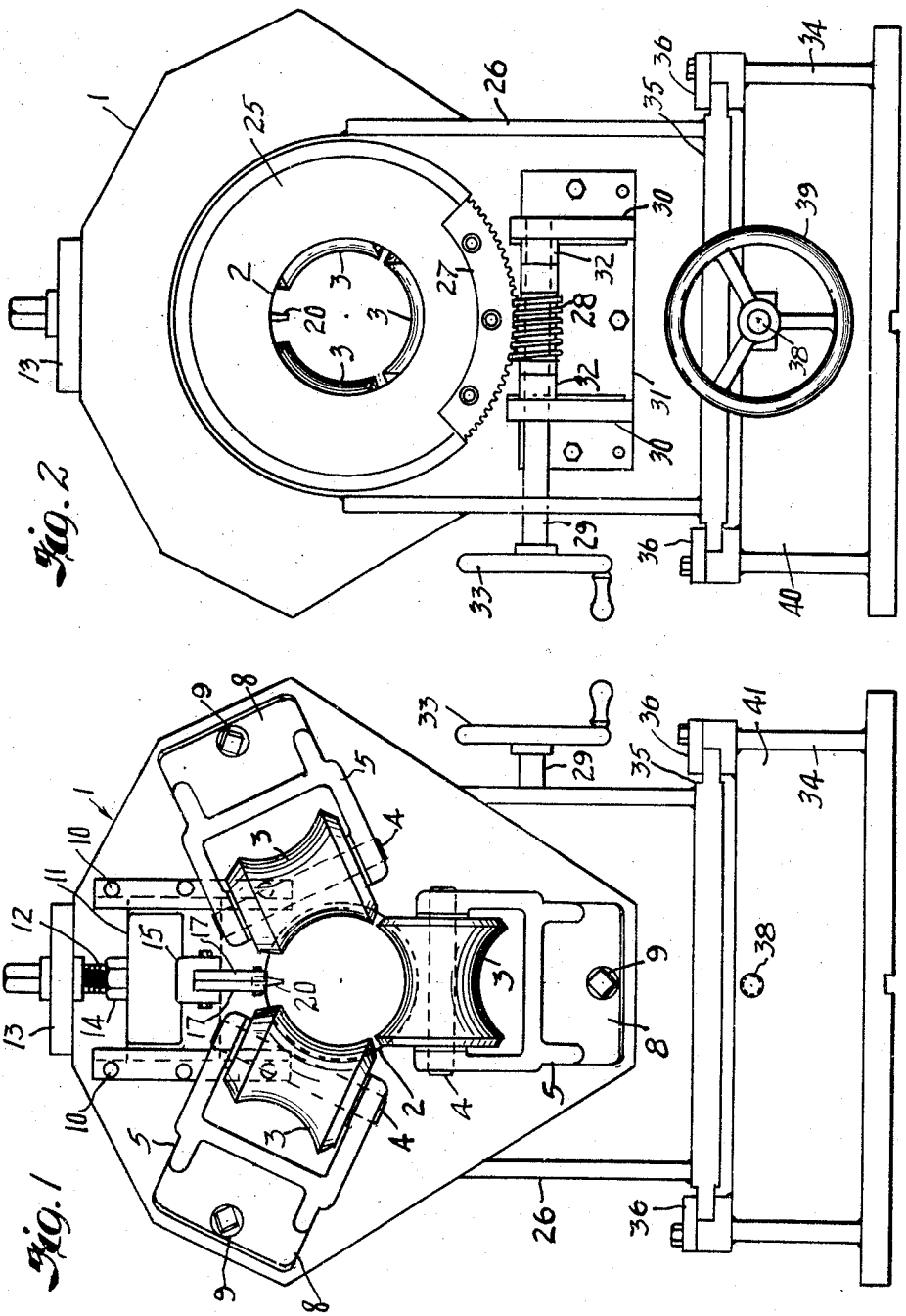
INVENTOR.
THOMAS J. CRAWFORD
BY
Oberlin & Limbach
ATTORNEYS.

July 29, 1958 T. J. CRAWFORD 2,845,038
SEAM GUIDE ASSEMBLY
Filed Aug. 9, 1954 2 Sheets-Sheet 2
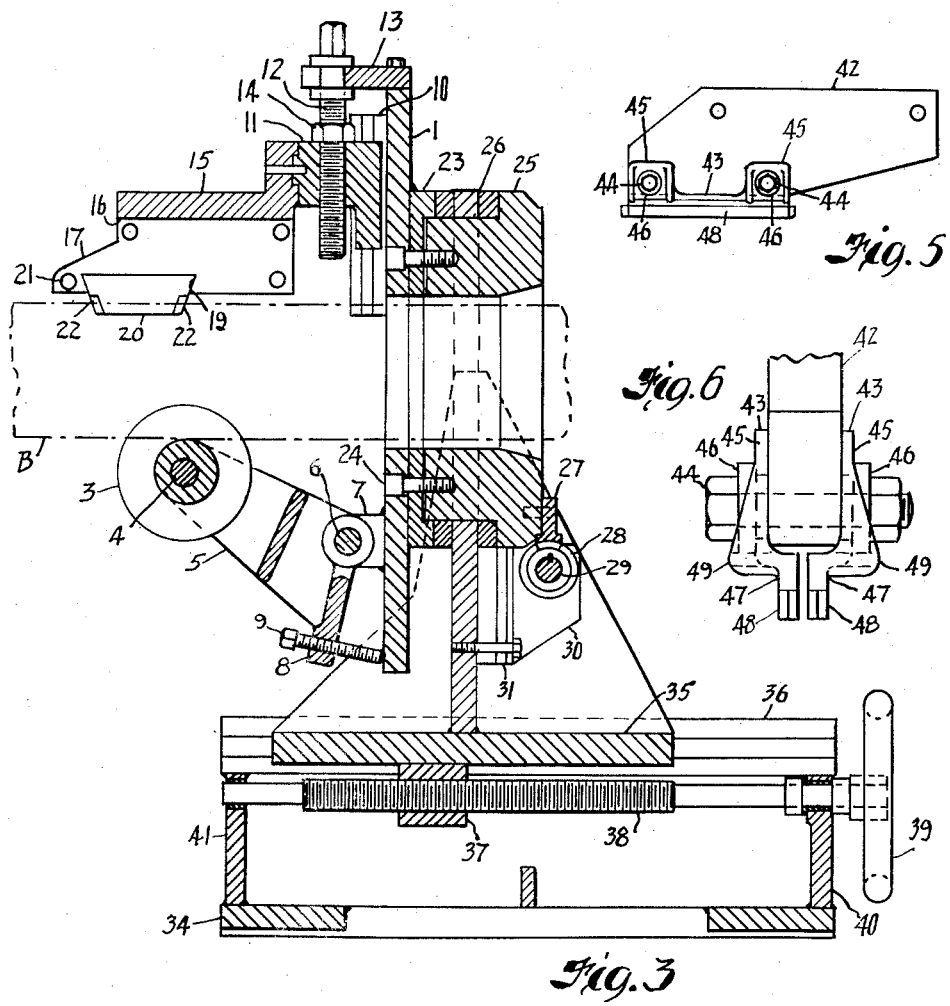
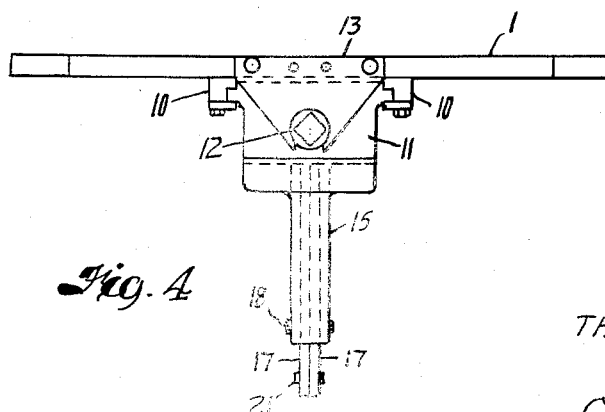
INVENTOR.
THOMAS J. CRAWFORD
BY
Oberlin & Limbach
ATTORNEYS.

United States Patent Office

2,845,038
Patented July 29, 1958

2,845,038

SEAM GUIDE ASSEMBLY

Thomas J. Crawford, Berkley, Mich.

Application August 9, 1954, Serial No. 448,671

6 Claims. (Cl. 113—59)

This invention relates to an improved seam guide assembly particularly suited for use in tube mill apparatus designed for the continuous production of welded tubing.

Apparatus of this type is well-known generally and comprises, briefly, power-driven rolls operative to advance and progressively form metal strip fed thereto into a tubular blank of desired cross-sectional size and shape, squeeze rolls for bringing together the resultant seam edges of the blank, and welding mechanism for heating the edges to a temperature at which they fuse. An example of apparatus constructed and operative in this manner will be found in my Patent No. 2,687,464. The active elements of the welder or heater, regardless of their specific nature, have a predetermined disposition relative to the intended path of movement of the work seam and it is, therefore, important that the seam be maintained properly positioned for efficient welding thereof. This has been accomplished by the provision of a guide adapted to engage in the seam immediately before the welding station, thereby to correct any circumferential displacement of the seam, for example due to longitudinal twisting of the blank, and to align the seam edges.

A primary object of my present invention is to provide an adjustable guide adapted to be operative in such general manner with enhanced control of the positioning and spacing of the seam edges made possible by the manipulative flexibility of the guide.

Another object is to provide a seam guide assembly including a member adapted to engage in the seam of a tubular blank, which member is rotatable about the blank axis to facilitate the often desired over-correction of twisting of the blank.

It is also an object of the invention to provide a guide assembly including a member adapted to engage in the seam of a tubular blank and means for supporting and guiding the body of the blank, said member and means being rotatable together as a unit about the blank for adjustment purposes.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a front elevational view of my new seam guide assembly;

Fig. 2 is a rear elevational view thereof;

Fig. 3 is a longitudinal center section of the assembly;

Fig. 4 is a top plan view of the support for the blade member adapted to engage in the work seam; and Figs. 5 and 6 are side and front elevational views, respectively, of a modified form of blade.

Referring now to the drawings in detail, the assembly comprises a mounting plate 1 having a central circular opening 2 of a diameter such that the tubular blank to be guided, shown in dashed lines at B in Fig. 3, can pass freely therethrough. Mounted on one side of the plate are three guide rolls 3 arranged about the opening and projecting inwardly thereof to engage substantially the entire wall of such a blank.

These rolls are individually both adjustable and removable, so that rolls of varying profiles, depending upon the size and shape of the work, may be substituted and accurately positioned in the assembly. Thus, each roll 3 is rotatably supported on a pin 4 of a roll housing 5, withdrawal of the pin permitting the roll to be removed and replaced. The housings 5 are respectively pivotally connected to the mounting plate by means of pivot pins 6 and mounts 7, whereby they may be rocked about such pivotal connections for adjustment generally in and out with respect to the opening of the mounting plate. Each housing further has an angular offset portion 8 through which a set screw 9 is threaded to bear against the mounting plate and hold the housing and roll in selected positions of adjustment, determined by threading of the screw.

Two vertical, spaced-apart rails 10 are attached to an upper portion of the mounting plate, at the same side on which the rolls are mounted, to form a slideway for a slide block 11. The block is movable along the rails toward and away from the plate opening 2 and is held in selected positions in this movement by an adjusting screw 12. The screw is threaded through the block and supported by an auxiliary horizontal plate 13 attached to the top of the mounting plate 1, a lock nut 14 being provided on the screw to engage the top of the block. Attached to the slide block 11, so as to move therewith, is a forwardly projecting bracket 15 which is elongated in the direction of the work movement through the assembly and has a groove 16 formed in its bottom wall.

Removably secured to the bracket are two flat spacers 17, preferably made of electrical insulating material, such as Micarta, the spacers having their upper edge portions fitted in the bracket groove 16 and held in place by transverse bolts 18. Corresponding recesses 19 are formed in the lower forward regions of the downwardly extending spacers cooperably to receive and support a blade 20, which is adapted to engage in the longitudinal seam of the blank. Additional bolts 21 located at the lower corner regions of the two spacers assist in holding the same tightly together with the blade gripped therebetween.

Blade 20 is elongated, to insure alignment of the seam edges contacted in operation by the respective sides thereof, and is held by the spacers and bracket in a plane which intersects the longitudinal axis of the tubular blank. The blade is made of a wear-resistant, insulating material, for example, bonded sapphire may be used. Ends 22 are convergent, as shown in Fig. 3, to assist the locking of the blade between the spacers, with the extreme lower portions thereof being preferably relieved, as shown, for ease of entry between the edges of the blank. The blade also has a downwardly tapering cross-section so that the spacing of the seam edges may be varied by moving the blade in and out.

A flanged ring 23 is fastened to the opposite side of the mounting plate, about the opening 2, and the ring and plate are secured by screws 24 to an end of a hollow cylindrical bearing block 25 with the end face of the block received within the flange of ring 23. Block 25, the center opening of which has the same diameter as the plate opening 2, is supported for rotation by a housing 26. The other end of the block projects beyond the housing and a worm gear sector 27 is attached to the lower portion of this end face for engagement with a worm 28 supported therebeneath on the housing. The worm is mounted on a shaft 29 which extends from one side of the assembly through flanges 30 of a bracket 31 on the housing, spacers 32 locating the worm between these flanges. A hand wheel 33 is provided at the outer end of shaft 29, and it will be clear that turning of this wheel will cause the mounting plate 1 to rotate about the axis of its circular opening, which is the axis of the tubular blank.

Accordingly, the guide rolls 3 and blade 20 may be rotated together as a unit about the blank for intial positioning and subsequent over-correction of any circumferential misalignment of the seam. Since the blade disposition will remain the same, that is, in the radial plane thereof, the contact of the seam edges with the sides of the blade will always be uniform. This is in contrast to an adjustment whereby the blade or a similar guide member is moved transversely in a straight line, the contact with the seam edges becoming non-uniform as soon as the member is off center.

A seam guide of this nature cooperably with the squeeze rolls usually employed determines the angle of approach of the seam edges, and this angle may be varied by changing the axial spacing of the blade from the squeeze rolls. In order to provide such a further adjustment, the housing 26 is supported for axial sliding movement on a base 34, the bottom plate 35 of the housing being movable along rails 36 secured to the base. A collar 37 is secured to the underside of the housing plate 35 and threaded therethrough is a traversing screw 38 having a hand wheel 39 at one end thereof. This screw is supported rotatably by the end plates 40 and 41 of the base, suitable bearings being provided. By actuation of hand wheel 39, an operator can, therefore, adjust the axial position of the mounting plate, the rolls and blade again being moved together as a unit.

A modified blade construction, which may be used in lieu of the blade 20 and spacers 17, has been illustrated in Figs. 5 and 6. This arrangement comprises a single spacer 42, made of electrical insulating material, adapted to be supported removably by the bracket 15 similarly as the earlier-described spacers 17. Two metal blades 43 of corresponding design are attached respectively to the sides of spacer 42 by means of bolts 44 extending through the same and ears 45 of the blades. The bolts are insulated from the blades by collars 46 of suitable insulating material.

Each blade 43 has an inwardly offset portion 47 disposed beneath spacer 42, with the two such portions of the blades being in laterally spaced-apart relation. The extreme lower edge portions 48 constitute the work-engaging sections of the blade, each adapted to engage at its outer side one of the seam edges. The ends of these portions project slightly beyond the bodies of the blades and are tapered to facilitate engagement with the work. Ribs 49 are provided to reinforce the blades.

With this modified construction, the opposed seam edges are spaced and positioned by engagement respectively with the outer sides of the two blades, both of which are inserted in the seam. When used in the complete assembly disclosed, this blade arrangement may also be adjusted vertically, rotatively, and axially as set forth in the foregoing, and it will be appreciated that blades of still different design may likewise be employed.

Other modes of applying the principle of the invention may be employed, change being made as regards the details described, provided the features stated in any of the following claims, or the equivalent of such be employed.

I therefore particularly point out and distinctly claim as my invention:

1. A seam guide assembly adapted to position opposed seam edges of a tubular blank advanced therethrough, comprising a mounting plate provided with an opening for free passage of such blank, plural guide rolls arranged on said plate in spaced apart relation about such opening adapted to engage the blank as the same advances through the assembly, individual support means for said rolls pivotally secured to said mounting plate, said supports being positionable to extend at various angles of adjustment relative to the longitudinal axis of the blank, thereby variably to locate the rolls respectively supported by the same, means associated with each such roll support means operative to hold the same in selected positions of adjustment, a blade adapted to be engaged in the seam of the blank thereby to position and space apart the seam edges, a support mounting said blade on said plate for reciprocation in a plane which intersects the longitudinal axis of the blank as guided by said rolls, means for releasably holding said blade in selected adjusted position in such movement thereof, rotatable support means for said mounting plate operative to hold the same in adjusted positions of rotation about such axis, whereby said guide rolls and said blade may be caused to rotate as a unit about the blank, and slide mechanism operative adjustably to reciprocate said rotatable support means generally parallel to such axis, the guide rolls and blade thereby being adjustable together also axially relative to the blank.

2. A seam guide assembly adapted to position opposed seam edges of a tubular blank advanced therethrough, comprising plural guide rolls disposed in spaced apart relation to engage such blank as the same advances through the assembly, means for adjusting said rolls individually in and out with respect to the path of blank advance, a blade adapted to be engaged in the seam of the blank thereby to position and space apart the seam edges, means supporting said blade for adjustable reciprocation independent of the rolls in a plane which intersects the longitudinal axis of the blank as guided by said rolls, means including a mounting plate for said guide rolls and such blade support means mounting the same for rotation as a unit about such axis, and means for adjustably moving said mounting plate selectively to position said guide rolls and blade together axially relative to the blank.

3. A seam guide assembly adapted to position opposing edges of a tubular blank advanced therethrough, comprising guide roll means disposed to engage the advancing blank, a blade adapted to engage in a seam of the blank to locate and space apart the edges of the same, means supporting said blade with the plane thereof generally radial relative to the longitudinal axis of the blank, means for adjustably positioning said blade in its plane toward and away from such axis, the blade being of variable thickness in its radial extent, whereby varying degrees of separation of the seam edges of the blank may be had by such adjustable positioning of the blade, and means mounting said guide roll means and said means supporting the blade for rotation as a unit about the axis of the blank with the blade being maintained in its general radial disposition.

4. A seam guide assembly as set forth in claim 3 further comprising means for adjusting said guide roll means and said means supporting the blade axially relative to the blank.

5. In tube welding apparatus wherein a tubular blank having spaced-apart converging longitudinal edges is advanced through welding means operative to weld such edges together, a seam guide assembly adjacent and in advance of such welding means, said assembly comprising a blade adapted to engage in the seam of the blank defined by such edges to locate and space apart the same, support means mounting said blade with the plane thereof generally radial relative to the longitudinal axis of the blank, means for adjustably positioning said blade in its plane toward and away from such axis, the blade being of variable thickness in its radial extent, whereby varying degrees of separation of the seam edges of the blank may be had by such adjustable positioning of the blade, and means for rotating said support means about such axis to adjust the blade rotatively while maintaining the general radial disposition thereof.

6. Apparatus as set forth in claim 5 further comprising means for adjustably moving said blade axially with respect to the blank.

References Cited in the file of this patent

UNITED STATES PATENTS

| | | |
|---|---|---|
| 1,296,970 | Fritz | Mar. 11, 1919 |
| 1,388,434 | Johnston | Aug. 23, 1921 |
| 1,851,563 | Chapman | Mar. 29, 1932 |
| 1,982,415 | Blevins | Nov. 27, 1934 |
| 1,997,272 | Adams | Apr. 9, 1935 |
| 2,196,106 | Darner | Apr. 2, 1940 |
| 2,197,962 | Anderson | Apr. 23, 1940 |
| 2,203,855 | Anderson | June 11, 1940 |
| 2,400,889 | Ridder | May 28, 1946 |
| 2,526,723 | Berkeley | Oct. 23, 1950 |
| 2,666,833 | Mott | Jan. 19, 1954 |
| 2,685,629 | Peck | Aug. 3, 1954 |